US006737469B2

(12) United States Patent
Takamura et al.

(10) Patent No.: US 6,737,469 B2
(45) Date of Patent: May 18, 2004

(54) METHOD OF ADDING WATER INSOLUBLE ORGANIC CHEMICALS TO STYRENE-BUTADIENE RUBBER LATEX DISPERSIONS AND RESULTING STYRENE-BUTADIENE RUBBER LATEX DISPERSIONS

(75) Inventors: Koichi Takamura, Charlotte, NC (US); Babak Golzar, Charlotte, NC (US); Vanessa M. Adams, Charlotte, NC (US)

(73) Assignee: BASF AG, Rheinland-Pralz (DE)

( * ) Notice: Subject to any disclaimer, the term of this patent is extended or adjusted under 35 U.S.C. 154(b) by 209 days.

(21) Appl. No.: 09/965,076

(22) Filed: Sep. 27, 2001

(65) Prior Publication Data

US 2003/0060549 A1 Mar. 27, 2003

(51) Int. Cl.$^7$ .................................................. C08L 9/08
(52) U.S. Cl. ........................ 524/575; 524/99; 524/108; 524/110; 524/361; 524/364; 524/365; 524/379
(58) Field of Search ..................... 524/575, 99, 108, 524/110, 361, 364–365, 379

(56) References Cited

U.S. PATENT DOCUMENTS

| | | | | |
|---|---|---|---|---|
| 3,988,275 A | * | 10/1976 | Satake et al. | 524/145 |
| 4,048,000 A | * | 9/1977 | McMaster et al. | 156/304.1 |
| 4,368,258 A | * | 1/1983 | Fujiwhara et al. | 430/493 |
| 4,386,965 A | | 6/1983 | Fringeli et al. | 106/214 |
| 4,918,135 A | | 4/1990 | Probst et al. | 524/714 |
| 5,571,850 A | | 11/1996 | Ma et al. | 523/160 |
| 5,725,656 A | * | 3/1998 | Shimanovich et al. | 106/778 |
| 6,297,002 B1 | * | 10/2001 | Toya et al. | 430/619 |

FOREIGN PATENT DOCUMENTS

| | | | | |
|---|---|---|---|---|
| DE | 40 13 005 | | 10/1991 | ........... C08L/21/00 |
| GB | 757 764 | | 2/1954 | |
| GB | 790 882 | | 2/1956 | |
| GB | 2003 486 | | 8/1977 | ............... C08J/3/20 |

OTHER PUBLICATIONS

English Language for International Search Repost PCT/US 02/28354, filing date Jun. 09, 2002, pp. 1–3.
English Language Abstracted DE 40 13 005.

* cited by examiner

*Primary Examiner*—Peter Szekely

(57) ABSTRACT

The present invention is a method of incorporating a water insoluble organic chemical into a styrene-butadiene rubber latex dispersion and the resulting styrene-butadiene rubber latex dispersion. A styrene-butadiene rubber latex dispersion is provided comprising an aqueous phase and a disperse phase, with the disperse phase including particles of styrene-butadiene rubber. An organic solvent that is miscible in water and the water insoluble organic chemical are added together to the styrene-butadiene rubber latex dispersion. The addition of the water-miscible organic solvent allows the water insoluble organic chemical to pass from the aqueous phase into the disperse phase thus limiting separation of the water insoluble organic chemical from the latex dispersion. The resulting SBR latex has increased properties over conventional latices that use the same amount of the water insoluble organic chemical but that do not include the water-miscible organic solvent.

29 Claims, No Drawings

METHOD OF ADDING WATER INSOLUBLE ORGANIC CHEMICALS TO STYRENE-BUTADIENE RUBBER LATEX DISPERSIONS AND RESULTING STYRENE-BUTADIENE RUBBER LATEX DISPERSIONS

FIELD OF THE INVENTION

The present invention relates to styrene-butadiene rubber (SBR) latex dispersions and more particularly to methods of adding water insoluble organic chemicals to SBR latex dispersions.

BACKGROUND OF THE INVENTION

Styrene-butadiene rubber (SBR) is the most widely used synthetic rubber in the world. Typically, an SBR latex dispersion is produced in an aqueous emulsion polymerization reaction using ratios of butadiene to styrene of about 3:1. The polymerization of the styrene and butadiene monomers is conducted in a water emulsion that includes a soap or surfactant, an initiator system and typically a molecular weight regulator. To prevent undesired crosslinking of the poly(styrene-butadiene), the Polymerization reaction can be terminated at below 100% monomer conversion by the addition of a shortstop, which reacts with free radicals and oxidizing agents in the initiator system to terminate polymerization. Once polymerization is terminated, unreacted styrene and butadiene monomers are removed by various processes known in the art. The resulting SBR polymer is an elastic rubbery polymer used for a variety of applications.

There are two common methods for producing SBR latex dispersions: a low temperature method (i.e. cold polymerization) and a high temperature method (i.e. hot polymerization). The low temperature method of producing SBR latex dispersions involves polymerizing styrene and butadiene monomers at temperatures typically between 5° C. and 25° C. to produce "cold" SBR polymer. The low temperature method can be used to make high molecular weight polymers without introducing excess crosslinking. The cold SBR polymer is typically produced using a redox initiator system and a natural soap such as the potassium or sodium salt of oleic acid or rosin acid. In the cold polymerization method, the polymerization reaction is typically terminated at well below 100% monomer conversion (e.g. 60–80%) by the addition of a shortstop, which reacts with free radicals and oxidizing agents in the redox initiator system to terminate polymerization and to prevent undesired crosslinking of the poly(styrene-butadiene).

Unlike the cold polymerization method, the high temperature method for producing SBR latex dispersions involves polymerizing styrene and butadiene monomers at temperatures in excess of 50° C., and generally in the range of 50–80° C., in the presence of a natural or synthetic surfactant. The SBR latex dispersions can be produced by the high temperature method using as much as 50% styrene monomers. Moreover, the high temperature method can have up to about 90% conversion of the styrene and butadiene monomers prior to termination of the polymerization reaction.

In addition to the above differences between the cold polymerization and hot polymerization methods, these methods differ in other respects. For example, once cold polymerization is completed, the SBR latex is typically agglomerated and excess water is removed by evaporation to produce a high solids SBR latex (or HSL) having up to 72% solids. As a result, the agglomeration process produces polymer particles with a broad particle size distribution and thus low viscosity dispersions can be produced with high solids contents. Thus, the low temperature method can be used to produce a SBR rubber that can be used in, e.g., passenger tires, asphalt modification, adhesives, latex foam and other types of applications.

The hot polymerized SBR, on the other hand, cannot be agglomerated to increase the solids content because of the high level of crosslinking and because a synthetic surfactant is used in polymerization. As a result, the hot polymerized SBR latex dispersion has a narrow particle size distribution and a solids content below 50%. Accordingly, hot polymerized SBR latex dispersions are generally referred to as "hot polymerized, medium solids SBR latex dispersions."

Another difference between cold polymerized SBR and hot polymerized SBR is that cold polymerized SBR is often vulcanized to introduce a desired amount of crosslinking into the SBR polymer. In contrast, because of the high level of crosslinking, the hot polymerized SBR latex is typically not vulcanized. In the vulcanization process, additives such as vulcanizing agents, vulcanization accelerators, prevulcanization inhibitors, antireversion agents, and the like can be added to the cold polymerized SBR latex. The cold polymerized SBR latex polymer can then be subjected to elevated temperatures thereby increasing the tensile strength of the SBR without significantly reducing its elongation.

For both cold polymerized SBR and hot polymerized SBR, antidegradant additives such as antioxidants and antiozonants are added to the SBR latex dispersion to prevent oxidation of the double bonds in the SBR polymer. These antidegradant additives and the vulcanization additives often included in cold polymerized SBR latex dispersions are added in the form of organic solids or aqueous dispersions to the latex dispersions and are often water insoluble organic materials. As a result, these additives become dispersed as particles in the latex dispersion under agitation. Furthermore, because these additives are not soluble in the aqueous latex dispersion and because they typically have higher or lower densities than water, the additives tend to separate from the latex during storage or transportation of the latex. These additives will often also separate from the latex when it is diluted. Accordingly, these additives do not produce the desired effect in the SBR latices. Therefore, there is a need in the art to reduce the separation of these water insoluble additives from aqueous SBR latices, and particularly from cold SBR latices.

SUMMARY OF THE INVENTION

It has been discovered that by adding an organic solvent that is miscible in water in small amounts to the SBR latex together with the water insoluble additives that the water insoluble additives are significantly less likely to separate from the latex. In particular, it has been discovered that the water-miscible organic solvent allows the water insoluble additives to partition into the latex polymer thereby producing increased properties in the latex. Alternatively, smaller amounts of the water insoluble additives can be added along with the water-miscible organic solvent to provide the same properties typically provided by comparatively larger amounts of the additives. Furthermore, the SBR latices of the invention are more stable in storage and transportation than conventional SBR latices including these water insoluble additives. The SBR latices of the invention are also stable even when diluted.

The present invention includes a method of incorporating a water insoluble organic chemical into a styrene-butadiene rubber latex dispersion. A styrene-butadiene rubber latex dispersion is provided comprising an aqueous phase and a disperse phase, with the disperse phase including particles of styrene-butadiene rubber. An organic solvent that is miscible in water and the water insoluble organic chemical are added together to the styrene-butadiene rubber latex dispersion. The organic solvent can then be removed if desired from the latex dispersion. The addition of the water-miscible organic solvent allows the water insoluble organic chemical to pass or partition from the aqueous phase into the disperse phase thus limiting separation of the water insoluble organic chemical from the latex dispersion. The water-miscible organic solvent is preferably selected from the group consisting of low molecular weight alcohols (e.g. C1–C3 alcohols such as methanol, ethanol, propanol, and isopropanol), acetone, dioxane, methyl ethyl ketone (MEK), and N-methyl-2-pyrrolidone (NMP). Preferably, the organic solvent is acetone or NMP. When added to the latex dispersion, a substantial portion of the water-miscible organic solvent preferably enters the disperse phase of the latex dispersion.

In accordance with the invention, the water insoluble organic chemical can be added to the water-miscible organic solvent as a solid or as an aqueous dispersion. Exemplary water insoluble organic chemicals include antioxidants, antiozonants, vulcanizing agents, vulcanization accelerators, prevulcanization inhibitors, antireversion agents, mixtures thereof, and the like. The styrene-butadiene rubber latex dispersion used in the invention is preferably a non-functionalized SBR rubber latex and is preferably prepared by polymerizing monomers consisting essentially of styrene, butadiene and optionally acrylonitrile. The styrene-butadiene rubber latex dispersion is also preferably a cold SBR latex prepared by polymerizing styrene, butadiene and optionally acrylonitrile monomers at a temperature less than or equal to about 25° C., more preferably between about 5° C. and 25° C., in the presence of a natural soap such as sodium or potassium oleate or the sodium or potassium salt of rosin acid. The SBR latex also preferably has a high total solids content of at least 65% by weight.

The present invention also includes a styrene-butadiene rubber latex dispersion, comprising an aqueous phase, a disperse phase comprising styrene-butadiene rubber latex particles, an organic solvent that is miscible in water, and a water insoluble organic chemical, wherein substantially all of the water insoluble organic chemical is provided in said disperse phase. The water-miscible organic solvent is preferably selected from the group consisting of low molecular weight alcohols, acetone, dioxane, methyl ethyl ketone (MEK) and N-methyl-2-pyrrolidone (NMP) and is more preferably either acetone or NMP. The water-miscible organic solvent is typically included in the styrene-butadiene rubber latex dispersion in an amount less than 5% by weight and more preferably less than 2% by weight, based on the weight of the latex polymer (solids).

As mentioned above, the styrene-butadiene rubber latex dispersion includes a water insoluble organic chemical in an amount greater than 0% and preferably less than or equal to about 5% by weight, based on the weight of the latex polymer. Suitable water insoluble organic chemicals include antioxidants, antiozonants, vulcanizing agents, vulcanization accelerators, prevulcanization inhibitors, antireversion agents, and mixtures thereof. The latex dispersion preferably includes styrene-butadiene rubber latex particles that are non-functionalized and that are derived from monomers consisting essentially of styrene, butadiene and optionally acrylonitrile. The styrene-butadiene rubber latex dispersion can also include a natural soap, which has been used to make the latex, such as sodium or potassium oleate or the sodium or potassium salt of rosin acid. The styrene-butadiene rubber latex dispersion preferably has a high solids content, e.g., a total solids content of at least 65% by weight.

These and other features and advantages of the present invention will become more readily apparent to those skilled in the art upon consideration of the following detailed description, which describes both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention includes a method of incorporating a water insoluble organic chemical into a styrene-butadiene rubber latex dispersion using an organic solvent that is miscible in water. The styrene-butadiene rubber latex dispersion is preferably prepared using a low temperature method as discussed, e.g., in R. W. Brown et al., "Sodium Formaldehyde in GR-S Polymerization", Industrial and Engineering Chemistry, vol. 46, pp. 1073 (1954) and B. C. Pryor et al., "Reaction Time for Polymerization of Cold GR-S" Industrial and Engineering Chemistry, vol. 45, pp. 1311 (1953), both of which are incorporated by reference herein in their entirety. In particular, the SBR latex is prepared by polymerizing styrene and butadiene monomers at a temperature less than or equal to about 25° C., and more preferably between 5° C. and 25° C., in an aqueous emulsion polymerization reaction. In addition, acrylonitrile monomers can be added to take place of a portion of the styrene monomers to prepare a nitrile rubber latex dispersion as the SBR latex dispersion.

The styrene-butadiene rubber latex dispersion used in the invention is preferably non-functionalized, i.e., is preferably prepared by polymerizing monomers consisting essentially of styrene, butadiene and optionally acrylonitrile. In particular, the styrene-butadiene rubber latex dispersion used in the invention is preferably substantially free (e.g. less than 1% by weight based on total monomer weight) of functional monomers such as hydrophilic monomers (e.g. vinyl carboxylic acids such as acrylic acid, methacrylic acid, itaconic acid and fumaric acid), which are used to produce carboxylated, polystyrene-butadiene (XSB) latex dispersions. More preferably, the styrene-butadiene rubber latex dispersion of the invention is prepared by polymerizing a mix of monomers that includes styrene, butadiene and optionally acrylonitrile and that is free of functional monomers. For example, the styrene-butadiene rubber latex dispersion can be prepared by polymerizing monomers consisting only of styrene, butadiene and optionally acrylonitrile.

The SBR polymer latex used in the present invention can be produced using either a continuous or batch process. In a preferred embodiment, the SBR polymer latex is produced using a continuous method by continuously feeding a monomer stream, a soap stream and an activator stream to a series of reactors. The monomers in the emulsion stream are preferably fed at a butadiene to styrene weight ratio from about 70:30 to about 86:14 (e.g. 78:22); however, acrylonitrile monomers can also be included in place of the styrene monomers in an amount up to about 25% based on total monomer weight. Preferably, the monomers in the emulsion stream are substantially free or free of functionalized monomers, and more preferably consist essentially of styrene, butadiene and optionally acrylonitrile.

The soap stream includes a soap, a free radical generator (e.g. organic peroxide) that is used in the redox initiator system, and water. The soap in the emulsion stream is preferably a natural soap such as sodium or potassium oleate or the sodium or potassium salt of rosin acid. The soap is typically present in the emulsion feed in an amount from about 0.5 to about 5 weight percent, based on total monomer weight.

The free radical generators used in the soap stream generally include organic peroxygen compounds such as benzoyl peroxide, hydrogen peroxide, di-t-butyl peroxide, dicumyl peroxide, 2,4-dichlorobenzoyl peroxide, decanoyl peroxide, lauroyl peroxide, diisopropylbenzene hydroperoxide, cumene hydroperoxide, p-menthane hydroperoxide, α-pinene hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, and the like; and alkyl perketals, such as 2,2-bis-(t-butylperoxy)butane, ethyl 3,3-bis(t-butylperoxy) butyrate, 1,1-di-(t-butylperoxy) cyclohexane, and the like. Preferably, the free radical generator includes diisopropylbenzene hydroperoxide or p-menthane hydroperoxide and the free radical generator is typically present in an amount between about 0.01 and 1% by weight based on total monomer weight.

The activator stream includes the other components of the redox initiator system. In particular, in addition to the free radical generator fed with the soap stream, the redox initiator system includes a reducing agent and a water-soluble metal salt of iron, copper, cobalt, nickel, tin, titanium, vanadium, manganese, chromium or silver.

Suitable reducing agents for use in the initiator stream include sulfur dioxide; alkali metal disulfites; alkali metal and ammonium hydrogen sulfites; thiosulfate, dithionite and formaldehyde sulfoxylates; hydroxylamine hydrochloride; hydrazine sulfate; glucose and ascorbic acid. Preferably, the reducing agent is sodium formaldehyde sulfoxylate dihydrate (SFS). The reducing agent is typically present in an amount between about 0.01 and 1% by weight based on total monomer weight. In addition, the weight ratio of reducing agent to free radical generator is preferably between about 0.2:1 and 1:1.

The water-soluble metal salt of iron, copper, cobalt, nickel, tin, titanium, vanadium, manganese, chromium or silver can be chosen from a wide variety of water-soluble metal salts. Suitable water-soluble metal salts include copper (II) amine nitrate, copper (II) metaborate, copper (II) bromate, copper (II) bromide, copper perchlorate, copper (II) dichromate, copper (II) nitrate hexahydrate, iron (II) acetate, iron (III) bromide, iron (III) bromide hexahydrate, iron (II) perchlorate, iron (III) dichromate, iron (III) formate, iron (III) lactate, iron (III) malate, iron (III) nitrate, iron (III) oxalate, iron (II) sulfate pentahydrate, cobalt (II) acetate, cobalt (II) benzoate, cobalt (II) bromide hexahydrate, cobalt (III) chloride, cobalt (II) fluoride tetrahydride, nickel hypophosphite, nickel octanoate, tin tartrate, titanium oxalate, vanadium tribromide, silver nitrate, and silver fluosilicate. The metal can also be complexed with a compound, such as ethylenediaminetetraacetic acid (EDTA) to increase its solubility in water. For example, iron/EDTA complexes or cobalt/EDTA complexes can be used. Preferably, the water soluble metal salt used is an iron (II) sulfate/EDTA complex. The water-soluble metal salt is typically present in an amount less than 0.01% by weight based on total monomer weight.

The polymerization reaction can be conducted in the presence of C8 to C12 mercaptans, such as octyl, nonyl, decyl or dodecyl mercaptans, which are used as molecular weight regulators or chain transfer agents to reduce the molecular weight of the SBR polymer. Typically, either n-dodecyl or t-dodecyl mercaptan is used and t-dodecyl mercaptan is the most commonly used. The amount of t-dodecyl mercaptan used will depend upon the molecular weight that is desired for the SBR. Larger quantities of t-dodecyl mercaptan cause greater reductions in the molecular weight of the SBR. The amount of t-dodecyl mercaptan is preferably between about 0.05 and 0.5% by weight based on total monomer weight.

The monomer feed, soap feed and activator feed are separately fed to a reactor where polymerization of the styrene and butadiene monomers occurs. The total amount of water in the reactors is typically about 60–75% by weight based on total monomer weight. The emulsion polymerization reaction normally produces between about 60% and about 80% conversion of the styrene and butadiene monomer into the poly(styrene-butadiene) or SBR particles.

Once the above level of conversion is reached, the polymerization reaction is terminated by the addition of a shortstop to the last of the reactors in the series, which reacts rapidly with free radicals and oxidizing agents, thus destroying any remaining initiator and polymer free radicals and preventing the formation of new free radicals. Exemplary shortstops include organic compounds possessing a quinonoid structure (e.g. quinone) and organic compounds that may be oxidized to a quinonoid structure (e.g. hydroquinone), optionally combined with water soluble sulfides such as hydrogen sulfide, ammonium sulfide, or sulfides or hydrosulfides of alkali or alkaline earth metals; N-substituted dithiocarbamates; reaction products of alkylene polyamines with sulfur, containing presumably sulfides, disulfides, polysulfides and/or mixtures of these and other compounds; dialkylhydroxylamines; N,N'-dialkyl-N,N'-methylenebishydroxylamines; dinitrochlorobenzene; dihydroxydiphenyl sulfide; dinitrophenylbenzothiazyl sulfide; and mixtures thereof. Preferably, the shortstop is hydroquinone or potassium dimethyl dithiocarbamate. The shortstop is typically added in an amount between about 0.01 and 0.1% by weight based on total monomer weight.

As mentioned above, the SBR polymer can also be produced using a batch process. In the batch process, the monomers, the soap, the free radical generator and water are all added to a reactor and agitated. After reaching the desired polymerization temperature, an activator solution including the reducing agent and the water soluble metal salt (e.g. the iron (II) sulfate/EDTA complex) are added to initiate polymerization. A short stop is added to terminate the polymerization once the desired conversion level is reached.

Once polymerization is terminated (in either the continuous or batch process), the unreacted monomers are then typically removed from the latex dispersion. For example, the butadiene monomers can be removed by flash distillation at atmospheric pressure and then at reduced pressure. The styrene monomers can be removed by steam stripping in a column. The resulting SBR latex at this point typically has a solids content of less than 50%. The SBR latex is then preferably agglomerated, e.g., using chemical, freeze or pressure agglomeration, and water is removed to increase the total solids content to up to about 72%. The resulting SBR latex has a Mooney viscosity, which is the resistance of the rubber to deformation as measured using a Mooney viscometer, of between 10 and 150, more preferably between 100 and 140, at 100° C.

An antioxidant is typically added to the SBR latex dispersion to prevent oxidation of the double bonds of the SBR polymer, and can either be added before or after vulcanization of the SBR latex. The antioxidants are typically substituted phenols or secondary aromatic amines. Exemplary substituted phenols include 2,6-di-t-butyl-p-cresol (DBT); 4,4'-thiobis(6-t-butyl-m-cresol); 3-t-butyl-4-hydroxyanisole (3-BHT); 2-t-butyl-4-hydroxyanisole (2-BHT); 2,2-methylenebis(4-methyl-6-t-butylphenol) (MBMBP); 2,2-methylenebis(4-ethyl-6-t-butylphenol) (MBEBP); 4,4'-butylidenebis(3-methyl-6-t-butylphenol) (SBMBP); 2,2-ethylidenebis(4,6-di-t-butylphenol); 2,6-di-t-butyl-4-sec-butylphenol; styrenated phenol; styrenated-p-cresol; 1,1,3-tris(2-methyl-4-hydroxy-5-t-butylphenol)butane; tetrakis[methylene-3-(3,5-di-t-butyl-4-hydroxyphenol) propionate] methane; n-octadecyl-3-(4-hydroxy-3,5-di-t-butylphenyl) propionate; triethylene glycol bis[3-(3-t-butyl-5-methyl-4-hydroxy-phenyl)propionate]; 1,3,5-trimethyl-2,4,6-tris(3,5-di-t-butyl-4-hydroxybenzyl)benzene; 2,2'-dihydroxy-3,3'-di (α-methylcyclohexyl)-5,5'-dimethyldiphenyl methane; 4,4-methylenebis(2,6-di-t-butylphenol); tris(3,5-di-t-butyl-4-hydroxyphenol); tris(3,5-di-t-butyl-4-hydroxyphenyl) isocyanurate; 1,3,5 tris(3',5'-di-t-butyl-4-hydroxybenzoyl) isocyanurate; bis[2-methyl-4-(3-n-alkylthiopropionyloxy)-5-t-butylphenyl]sulfide; 1-oxy-3-methylisopropylbenzene; 2,5-dibutylhydroquinone; 2,2'-methylenebis(4-methyl-6-nonylphenol); alkylated bisphenol; 2,5-di-t-amylhydroquinone; polybutylated bisphenol-A; bisphenol-A; 2,6-di-t-butyl-p-ethylphenol; 2,6-bis(2'-hydroxy-3-t-butyl-5'-methylbenzyl)-4-methylphenol; 1,3,5-tris(4-t-butyl-3-hydroxy-2,6-dimethylbenzyl)isocyanurate; terephthaloyl-di(2,6-dimethyl-4-t-butyl-3-hydroxybenzyl sulfide); 2,6-t-butylphenol; 2,6-di-t-butyl-2-dimethylamino-p-cresol; 2,2'-methylenebis(4-methyl-6-cyclohexylphenol); hexamethylene glycol bis(3,5-t-butyl-4-hydroxyphenyl) propionate; (4-hydroxy-3,5-di-t-butylanilino)-2,6-bis (octylthio)-1,3,5-triazine; 2,2-thio[diethyl-bis-3-(3,5-di-t-butyl-4-hydroxyphenyl)propionate]; N,N'-hexamethylene (3,5-di-t-butyl-4-hydroxycinnamide); 3,5-di-t-butyl-4-hydroxybenzylphosphoric acid diethyl ester; 2,4-dimethyl-6-t-butylphenol; 4,4'-methylenebis(2,6-di-t-butylphenol); 4,4'-thiobis(2-methyl-6-t-butylphenol); tris[2-(3,5-di-t-butyl-4-hydroxyphenyl)propionyloxyethyl]isocyanurate; 2,4,6-tributylphenol; bis[3,3-bis(4'-hydroxy-3'-t-butylphenyl)butyric acid]glycol ester; 4-hydroxymethyl-2,6-di-t-butylphenol; and bis(3-methyl-4-hydroxy-5-t-butylbenzyl) sulfide. Exemplary secondary aromatic amines include N-phenyl-N'-isopropyl-p-phenylenediamine; N-phenyl N'-(1,3-dimethylbutyl)-p-phenylenediamine; N,N'-diphenyl-p-phenylenediamine; dioctyl-diphenylamine; dibetanaphthyl-p-phenylenediamine; 2,2,4-trimethyl-1,2-dihydroquinoline polymer and diaryl-p-phenylenediamine. In addition, sulfur containing antioxidants such as dilauryl thiodipropionate, distearyl thiodipropionate and 2-mercapto-benzimidazol; phosphorus containing antioxidants such as distearylpentaerythritol diphosphite; nickel containing antioxidants such as nickel diisobutyldithiocarbamate, nickel dimethyldithiocarbamate and nickel di-n-butyldithiocarbamate; 2-mercaptotoluimidazole; zinc 2-mercaptotoluimidazole; and 1,11-(3,6,9-trioxaundecyl)bis-3-(dodecylthio) propionate can be used in accordance with the invention. The particular antioxidant used will depend on the application for which the SBR polymer is to be used as is well understood to those skilled in the art. The antioxidant is typically provided in an amount from about 0.1 to about 5.0 percent, and preferably in an amount from about 0.5 and about 2.0 percent, and more preferably in an amount of about 1.0 percent, by weight based on the weight of the SBR polymer.

Antiozonants can also be added to the SBR latex to prevent ozone present in the atmosphere from cracking the SBR, by cleaving the double bonds of the SBR polymer. Typical antiozonants include waxes (e.g. VANWAX® H commercially available from R. T. Vanderbilt Co., Inc.) and N,N'-alkylaryl, N-N' dialkyl and N,N'-diaryl derivatives of p-phenylenediamine such as N,N'-di(2-octyl)-p-phenylenediamine, N,N'-di-3(5-methylheptyl)-p-phenylenediamine, N-(1,3-dimethylbutyl)-N'-phenyl-p-phenylenediamine (e.g. ANTOZITE® 67P commercially available from R. T. Vanderbilt Co., Inc.), N-isopropyl-N'-phenyl-p-phenylenediamine, and N-cyclohexyl-N'-phenyl-pphenylenediamine. The antiozonants are typically provided in an amount from about 0.5 to about 10 percent, preferably in an amount from about 1 and about 5 percent, and more preferably in an amount from about 1.5 to about 3 percent, by weight based on the weight of the SBR polymer.

In the event that the SBR polymer is to be vulcanized, prevulcanization inhibitors can also be added to the SBR latex to prevent premature vulcanization or scorching of the SBR polymer. For example, N-cyclohexylthio-phthalimide; phthalic anhydride; N-cyclohexyl-thiophthalimide; N-phenyl-N-(trichloromethyl sulfenyl)-benzene sulfonamide; bis-(sulfonamido)-sulfides or polysulfides (e.g. bis-(N-methyl-p-toluenesulfonamido)-disulfide); substituted thiophosphoramides (e.g. N-cyclohexylthio-N-phenyldiethylphosphoramide); N-(sulfenyl) methacrylamides; thio-substituted-1,3,5-triazine, -diamine or -triamines; 2-(thioamino)-4,6-diamino-1,3,5-triazines; N,N'-substituted bis-(2,4-diamino-s-triazin-6-yl)-oligosulfides; and substituted thioformamidines can be used as prevulcanization inhibitors. More preferably, the prevulcanization inhibitor is N-cyclohexylthio-phthalimide (SANTOGARD® PVI commercially available from Flexsys) or N-phenyl-N-(trichloromethyl sulfenyl)-benzene sulfonamide (VULKALENT® E commercially available from Bayer). The prevulcanization inhibitor is typically provided in an amount from about 1 and about 5 percent, and more preferably in an amount from about 1.5 to about 3 percent, by weight based on the weight of the SBR polymer.

The SBR latex is often vulcanized to crosslink the SBR polymer thereby increasing the tensile strength and elongation of the rubber by heating the SBR, typically in the presence of vulcanizing agents, vulcanization accelerators, antireversion agents, and optionally crosslinking agents. Exemplary vulcanizing agents include various kinds of sulfur such as sulfur powder, precipitated sulfur, colloidal sulfur, insoluble sulfur and high-dispersible sulfur; sulfur halides such as sulfur monochloride and sulfur dichloride; sulfur donors such as 4,4'-dithiodimorpholine; selenium; tellurium; organic peroxides such as dicumyl peroxide and di-tert-butyl peroxide; quinone dioximes such as p-quinone dioxime and p,p'-dibenzoylquinone dioxime; organic polyamine compounds such as triethylenetetramine, hexamethylenediamine carbamate, 4,4'-methylenebis (cyclohexylamine) carbamate and 4,4'-methylenebis-o- chloroaniline; alkylphenol resins having a methylol group; and mixtures thereof. The preferred vulcanizing agents include sulfur dispersions or sulfur donors and depend on the application as would be readily understood to those skilled in the art. It is noted that the sulfur is not soluble in the water-miscible organic solvents and thus, if the water-miscible organic solvent is to be used to partition the vulcanizing agent into the latex particle, a sulfur donor is preferably used. The vulcanizing agent is typically present within a range of from 0.1 to 15%, preferably from 0.3 to 10%, and more preferably from 0.5 to 5%, by weight based on the weight of the SBR polymer.

Exemplary vulcanization accelerators for use in the invention include sulfenamide-type vulcanization accelerators such as N-cyclohexyl-2-benzothiazole sulfenamide, N-t-butyl-2-benzothiazole sulfenamide, N-oxyethylene-2-benzothiazole sulfenamide, N-oxydiethylene-2-benzothiazole sulfenamide, N-oxydiethylene-thiocarbamyl-N-oxydiethylene sulfenamide, N-oxyethylene-2-benzothiazole sulfenamide and N,N'-diisopropyl-2-benzothiazole sulfenamide; guanidine-type vulcanization accelerators such as diphenylguanidine, di-o-tolylguanidine and di-o-tolylbiguanidine; thiourea-type vulcanization accelerators such as thiocarboanilide, di-o-tolylthiourea, ethylenethiourea, diethylenethiourea, dibutylthiourea and trimethylthiourea; thiazole-type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt, 4-morpholinyl-2-benzothiazole disulfide and 2-(2,4-dinitrophenylthio)benzothiazole; thiadiazine-type vulcanization accelerators such as activated thiadiazine; thiuram-type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamic acid-type vulcanization accelerators such as sodium dimethyldithiocarbamate, sodium diethyldithiocarbamate, sodium di-n-butyldithiocarbamate, lead dimethyldithiocarbamate, lead diamyldithiocarbamate, zinc diamyldithiocarbamate, zinc dimethyldithiocarbamate, zinc diethyldithiocarbamate, zinc di-n-butyldithiocarbamate, zinc pentamethylene dithiocarbamate, zinc ethylphenyldithiocarbamate, tellurium diethyldithiocarbamate, bismuth dimethyldithiocarbamate, selenium dimethyldithiocarbamate, selenium diethyldithiocarbamate, cadmium diethyldithiocarbamate, copper dimethyldithiocarbamate, iron dimethyldithiocarbamate, diethylamine diethyldithiocarbamate, piperidinium pentamethylene dithiocarbamate and pipecoline pentamethylene dithiocarbamate; xanthogenic acid-type vulcanization accelerators such as sodium isopropylxanthogenate, zinc isopropylxanthogenate and zinc butylxanthogenate; isophthalate-type vulcanization accelerators such as dimethylammonium hydrogen isophthalate; aldehyde amine-type vulcanization accelerators such as butyraldehyde-amine condensation products and butyraldehyde-monobutylamine condensation products; and mixtures thereof. The vulcanization accelerator used with the invention will depend on the application as will be understood by those skilled in the art. The vulcanization accelerator is typically present within a range of from 0.1 to 15%, preferably from 0.3 to 10%, and more preferably from 0.5 to 5%, by weight based on the weight of the SBR polymer.

Antireversion agents can also be included in the vulcanization system to prevent reversion, i.e., an undesirable decrease in crosslink density. Suitable antireversion agents include zinc salts of aliphatic carboxylic acids, zinc salts of monocyclic aromatic acids, bismaleimides, biscitraconimides, bisitaconimides, aryl bis-citraconamic acids, bissuccinimides, and polymeric bissuccinimide polysulfides (e.g. N,N'-xylenedicitraconamides). The antireversion agent is typically present in a range of from 0 to 5%, preferably from 0.1 to 3%, and more preferably from 0.1 to 2%, by weight based on the weight of the SBR polymer.

The above additives (antioxidants, antiozonants, prevulcanization inhibitors, vulcanizing agents, vulcanization accelerators and antireversion agents) are mixed with the SBR latex dispersion. Although not preferred, crosslinking agents can also be included in the vulcanization system in small amounts to facilitate crosslinking of the SBR polymer chains and are typically organic peroxides. The SBR latex dispersion can be vulcanized at an elevated temperature and pressure and the vulcanization process is well understood by those skilled in the art.

As is well understood by those skilled in the art, the additives used in the SBR latex dispersions of the invention are typically water insoluble organic chemicals. These water insoluble organic chemicals can include antioxidants, antiozonants, vulcanizing agents, vulcanization accelerators, prevulcanization inhibitors, antireversion agents, crosslinking agents (if used), mixtures thereof, and the like. The invention is particularly useful with vulcanizing agents, vulcanization accelerators, prevulcanization inhibitors, antireversion agents and antioxidants. These water insoluble organic chemicals are typically considered to be insoluble or slightly soluble in water at 20° C. As noted above, these water insoluble organic chemicals tend to become separated from the SBR latex in storage and transport of the SBR latex dispersion.

In accordance with the invention, at least one water-miscible organic solvent is added to the SBR latex dispersion and has been found to greatly reduce the separation of the water insoluble organic chemicals added to the SBR latex dispersion. In particular, it has been discovered that when the water-miscible organic solvent is included in the styrene-butadiene rubber latex dispersion in an amount less than 5% by weight, preferably less than 2% by weight, and even less than 1% by weight, based on the weight of the latex polymer, the water-miscible organic solvent stabilizes the SBR latex in storage and transport and limits or prevents the separation of the water insoluble organic chemicals from the SBR latex dispersion.

The water-miscible organic solvents for use in the invention are preferably sufficiently miscible in water that the solvents will dissolve into the latex dispersion instead of forming a separate phase such as droplets or globules in the latex dispersion. The water-miscible organic solvents for use in the invention also preferably will partition into the SBR latex polymer when added to the latex dispersion. In particular, it is preferred that a significant portion of the water-miscible organic solvent will exit the aqueous phase and partition or pass into the SBR latex polymer. For example, at least 50% of the water-miscible organic solvent exits the aqueous phase and partitions into the latex particles of the disperse phase. The amount of the water-miscible organic solvent that remains in the aqueous phase or conversely that enters the SBR latex polymer depends on many parameters including the partition coefficient of the solvent between water and the latex polymer, the amount of latex polymer (solids content), the size of the latex particles, and the like. The partition coefficient is a function of many parameters such as the monomer composition, the molecular weight, the crosslinking density, the chemical composition of the water insoluble organic solids used and temperature of the latex.

The water-miscible organic solvent is preferably either a low boiling point or a high boiling point solvent. The low boiling point water-miscible solvents are preferably easily removed from the SBR latex when the water is removed to increase the solids content of the latex. Preferably, the low boiling point solvent has a boiling point less than about 100° C., more preferably less than about 85° C. Exemplary water-miscible, low boiling point organic solvents include acetone, methanol, ethanol, isopropanol, n-propanol, and methyl ethyl ketone. More preferably, the low boiling point water-miscible solvent is acetone.

The high boiling point water-miscible organic solvents for use in the invention preferably have a boiling point of greater than about 145° C., more preferably greater than about 180° C., so they do not contribute to the volatility of the latex dispersion. Furthermore, the high boiling point water-miscible organic solvents are preferably inert in the latex dispersion and do not adversely affect the properties of the latex dispersion. The preferred high boiling point water-miscible organic solvent is N-methylpyrrolidinone (NMP). Typically, the high boiling point water-miscible organic solvents are used in an amount less than 2% by weight, more preferably less than 1% by weight, based on the latex polymer.

The water insoluble organic chemical used in the invention is added to the water-miscible organic solvent prior to mixing the water insoluble organic chemical and water-miscible organic solvent with the latex dispersion. In particular, the water insoluble organic chemical is typically added to the water-miscible organic solvent as a solid or as an aqueous dispersion. The water-miscible organic solvent can then be removed if desired from the latex dispersion, e.g., by vacuum distillation when water is removed to increase the solids content, particularly if the water-miscible organic solvent is a low boiling point solvent.

The addition of the water-miscible organic solvent allows the water insoluble organic chemical to pass or partition from the aqueous phase into the disperse phase thus limiting separation of the water insoluble organic chemical from the latex dispersion. In particular, because of the presence of the water-miscible organic solvent, the water insoluble organic chemicals are partitioned directly into the latex polymer through the latex serum. As a result, the water insoluble organic chemicals are not likely to precipitate or separate out of the latex during storage and transportation. Therefore, less of the water insoluble organic chemical can be added to the SBR latex than is typically included in conventional formulations without sacrificing the properties of the SBR latex. Alternatively, the same amount of the water insoluble organic chemical can be added to the latex to provide increased properties over conventional formulations.

The styrene-butadiene rubber latex dispersion produced in accordance with the invention includes an aqueous phase, a disperse phase comprising styrene-butadiene rubber latex particles, an organic solvent that is miscible in water, and a water insoluble organic chemical, wherein substantially all of the water insoluble organic chemical is provided in the disperse phase. For example, more than 90%, preferably more than 95%, and more preferably more than 99% by weight, of the water insoluble organic chemical is provided in said disperse phase. The amount of the water insoluble organic chemical provided in the disperse phase can be determined by optical means, e.g., by microscopic observation of the latex, or by separating the components of the latex using a centrifuge and measuring the amount of the water insoluble organic chemical not included in the latex particles.

The water-miscible organic solvent is typically included in the styrene-butadiene rubber latex dispersion in an amount less than 5% by weight, preferably less than 2% by weight, and more preferably less than 1% by weight, based on the weight of the latex polymer. When low boiling point organic solvents are used as discussed above, the styrene-butadiene rubber latex dispersion typically includes significantly less than 1% of the low boiling point organic solvent by weight of the organic solvent, based on the weight of the latex polymer, if the organic solvent is removed from the latex dispersion.

As mentioned above, the styrene-butadiene rubber latex dispersion includes a water insoluble organic chemical in an amount greater than 0% and preferably less than or equal to about 5% by weight based on the weight of the latex polymer. Suitable water insoluble organic chemicals include antioxidants, antiozonants, vulcanizing agents, vulcanization accelerators, prevulcanization inhibitors, antireversion agents, and mixtures thereof. The styrene-butadiene rubber latex dispersion preferably has a high solids content, e.g., a total solids content of at least 65% by weight and typically of from 65% to 70% by weight. The resulting SBR latex dispersion of the invention including the water insoluble organic chemicals can be used in various types of SBR applications known in the art.

Although the present invention is described above with respect to cold polymerized SBR, the present invention can also be used with hot polymerized SBR. In particular, although hot polymerized SBR is typically not vulcanized and thus generally does not include the vulcanization additives discussed above, the water-miscible organic solvents of the invention can be used to increase the stability of antioxidants and antiozonants in the hot polymerized SBR. The hot polymerized SBR is also not generally agglomerated and water is not removed to increase its solids content and thus it typically has a solids content of less than 50%. Accordingly, it is generally preferred that high boiling point water-soluble solvents such as NMP are used with hot polymerized SBR.

The present invention will now be further described by the following non-limiting examples. Except where otherwise indicated, percentages are on a per weight basis and solutions are aqueous solutions.

EXAMPLE 1

A 30% solution of SANTONOX® TBMC (4,4-thiobis(6-tert-butyl-m-cresol) commercially available from Flexsys) in N-methyl-2-pyrrolidone (NMP, commercially available from BASF Corporation) was prepared. SANTONOX® TBMC is a highly active non-staining, non-discoloring antioxidant typically used for synthetic elastomers. The TBMC/N-methyl-2-pyrrolidone solution was added to water and TBMC particles immediately precipitated out of the water. One gram of the 30% TBMC solution in N-methyl-2-pyrrolidone was also added to 100 g of BUTONAL® NS104 (a high solids content poly(styrene-butadiene) rubber latex with 71% solids) to prepare a latex dispersion containing 0.42% SANTONOX® TBMC. The TBMC did not precipitate out of the latex but instead was partitioned directly into the latex polymer through the latex serum. In particular, the resulting latex was viewed under an optical microscope at 200× magnification and no TBMC particles were observed. Typically, amounts of TBMC particles as small as 0.1%, when added to the latex without the water-miscible organic solvent, are detectable under an optical microscope at 200× magnification. The SBR latex dispersion remained stable without coagulum formation and without precipitation after two months in storage and even after centrifugation of the latex dispersion.

COMPARATIVE EXAMPLE 1

The minimum level of SANTONOX® TBMC needed to prevent discoloration of the BUTANOL® NS104 using post-addition (without addition of a water-miscible organic solvent) was determined. A latex dispersion was prepared containing 1% TBMC by adding 0.71 g of TBMC to 100 g of the BUTANOL® NS104 latex and then diluted with the appropriate amount of BUTANOL® NS104 to produce different latex samples containing 15, 30, 60, 125, 250 and 500 ppm (based on the weight of dry latex polymer) of SANTONOX® TBMC. Each of the latex samples was spread on glass plates to prepare films approximately 200 μm thick and the films were dried completely at ambient temperature. Films representing each of the samples were placed in an oven at 130° C. for 3 hours for accelerated heat aging. In addition, films representing each of the samples were not heat-aged. The heat-aged latex films that included 60 ppm or greater of SANTONOX® TBMC remained clear and maintained their original flexibility as did the samples that were not subjected to heat aging. The latex films that included less than 60 ppm of SANTONOX® TBMC were bright brown in color and had a lesser degree of elongation than the non-heat treated film when stretched.

EXAMPLE 2

Based on the results from Comparative Example 1, two BUTANOL® NS104 samples were prepared using the 30% TBMC solution in N-methyl-2-pyrrolidone described in Example 1. The samples included 30 and 60 ppm of SANTONOX® TBMC, respectively, by adding 0.14 g of the 30% TBMC solution from Example 1 to 1000 g of the BUTANOL® NS104 latex to produce the 60 ppm sample and diluting the 60 ppm sample with BUTANOL® NS104 to produce the 30 ppm sample. The latex samples were centrifuged at 2000 rpm for 15 minutes to accelerate the sedimentation of the compounds present in the latex samples to determine if potential sedimentation problems would occur during prolonged storage and transportation of the latex samples. The latex samples were spread on glass plates to prepare films approximately 200 μm thick and the films were dried completely at ambient temperature. Films representing each of the samples were placed in an oven at 130° C. for 3 hours for heat aging. In addition, films representing each of the samples were not heat-aged. The heat-aged films including the 30 and 60 ppm samples were as clear and flexible as the non-heat-aged films. A sample was also prepared using the 30% TBMC solution in NMP described in Example 1 with 10 ppm of SANTONOX® TBMC latex and was formed into a film, dried and heat aged in the manner described above. The 10 ppm sample also was clear and the antioxidant protected the latex film from discoloration. Accordingly, when NMP was used, only 10 ppm of the antioxidant was needed to prevent discoloration while 60 ppm of the antioxidant was needed to prevent discoloration when the NMP was not used.

EXAMPLE 3

Based on the results from Comparative Example 1, four BUTANOL® NS104 samples were prepared using a 50% SANTONOX™ TBMC solution in acetone. The samples included 1000, 250, 60 and 15 ppm of SANTONOX® TBMC, respectively, by adding 0.142 g of the 50% TBMC/acetone solution to 100 g of the BUTANOL® NS104 latex to produce the 1000 ppm sample and diluting the 1000 ppm sample with BUTANOL® NS104 to produce the 250, 60 and 15 ppm samples. These four latex samples and a BUTANOL® NS104 sample (without TBMC) were spread on glass plates to prepare films approximately 200 μm thick and the films were dried completely at ambient temperature. Films representing each of the samples were placed in an oven at 130° C. for 3 hours for heat aging. The heat-aged films including the 1000, 250 and 60 ppm samples were as clear and flexible as the non-heat-aged films. The samples with 15 ppm and the sample with BUTANOL® NS104 (without TBMC) were discolored to yellow.

EXAMPLE 4

A 10% solution of SULFASAN® DTDM (4,4'-dithiodimorpholine commercially available from Flexsys) in N-methyl-2-pyrrolidone was prepared. SULFASAN® DTDM is a sulfur donor vulcanizing agent used for SBR latices. The DTDM/N-methyl-2-pyrrolidone solution was added to water and needles a few hundred micrometers in length formed that were clearly visible under an optical microscope at 100× magnification. These needles could be easily removed by filtration through a 80-mesh screen. 2.13 g of the 10% DTDM solution in N-methyl-2-pyrrolidone was also added to 100 g of BUTONAL® NS104 (71% solids) resulting in 0.3% DTDM based on the weight of dry polymer. The resulting latex was viewed under an optical microscope at 100× magnification and no needles of DTDM were observed demonstrating that the DTDM partitioned directly into the latex polymer through the latex serum.

EXAMPLE 5

A 30% solution of SANTOGARD® PVI (N-(cyclohexylthio) phthalimide commercially available from Flexsys) in N-methyl-2-pyrrolidone was prepared. SANTOGARD® PVI is a pre-vulcanization inhibitor used with SBR latices. Addition of this solution to BUTONAL® NS104 did not result in precipitation of the SANTOGARD® PVI.

EXAMPLE 6

A 30% solution of PERKALINK® 900 (1,3-bis(citraconimidomethyl)benzene commercially available from Flexsys) in N-methyl-2-pyrrolidone was prepared. PERKALINK® 900 is an anti-reversion agent used with SBR latices. Addition of this solution to BUTONAL® NS104 did not result in precipitation of the PERKALINK® 900.

It is understood that upon reading the above description of the present invention, one skilled in the art could make changes and variations therefrom. These changes and variations are included in the spirit and scope of the following appended claims.

What is claimed is:

1. A method of incorporating a water insoluble organic chemical into a styrene-butadiene rubber latex dispersion, comprising the steps of:

providing a styrene-butadiene rubber latex dispersion comprising an aqueous phase and a disperse phase, said disperse phase comprising particles of styrene-butadiene rubber;

adding an organic solvent that is miscible in water to the styrene-butadiene rubber latex dispersion; and adding a water insoluble organic chemical to the styrene-butadiene rubber latex dispersion;

whereby the addition of said organic solvent allows the water insoluble organic chemical to pass from the aqueous phase into the disperse phase thus limiting separation of the water insoluble organic chemical from the latex dispersion, wherein the organic solvent is present in an amount that is less than 5% by weight based on the weight of the latex polymer, and wherein the water insoluble organic chemical is at least one of a vulcanizing agent, a vulcanization accelerator, a prevulcanization inhibitor, an antireversion agent, and an antioxidant.

2. The method according to claim 1, wherein said adding steps comprise combining the organic solvent and the water insoluble organic chemical and adding the organic solvent and the water insoluble organic chemical together into the polymer dispersion.

3. The method according to claim 1, wherein said step of adding an organic solvent comprising adding an organic solvent selected from the group consisting of C1–C3 alcohols, acetone, dioxane, methyl ethyl ketone (MEK) and N-methyl-2-pyrrolidone (NMP).

4. The method according to claim 1, wherein said step of adding an organic solvent comprising adding an organic solvent selected from the group consisting of acetone and N-methyl-2-pyrrolidone (NMP).

5. The method according to claim 1, wherein said providing step comprises preparing a styrene-butadiene rubber latex dispersion by polymerizing monomers consisting essentially of styrene, butadiene and optionally acrylonitrile.

6. The method according to claim 1, wherein said providing step comprises providing a non-functionalized styrene-butadiene rubber latex dispersion.

7. The method according to claim 1, wherein said providing step comprises preparing a styrene-butadiene rubber latex dispersion by polymerizing styrene and butadiene monomers at a temperature less than or equal to about 25° C.

8. The method according to claim 1, wherein said providing step comprises preparing a styrene-butadiene rubber latex dispersion by polymerizing styrene and butadiene monomers in the presence of a natural soap.

9. The method according to claim 8, wherein said preparing step includes a natural soap selected from the group consisting of sodium or potassium oleate and the sodium or potassium salt of rosin acid.

10. The method according to claim 1, wherein the providing step comprises providing a styrene-butadiene rubber latex dispersion having a total solids content of at least 65% by weight.

11. The method according to claim 1, wherein said step of adding a water insoluble organic chemical comprises adding the solid water insoluble organic chemical as a solid.

12. The method according to claim 1, wherein said step of adding a water insoluble organic chemical comprises adding the water insoluble organic chemical as an aqueous dispersion.

13. The method according to claim 1, wherein said step of adding an organic solvent comprises adding an organic solvent with a boiling point of less than about 85° C.

14. The method according to claim 13, further comprising the step of removing the organic solvent from the latex dispersion.

15. The method according to claim 1, wherein said step of adding en organic solvent comprises adding an organic solvent with a boiling point of greater than about 180° C.

16. A styrene-butadiene rubber latex dispersion, comprising:

an aqueous phase;

a disperse phase comprising styrene-butadiene rubber latex particles;

an organic solvent that is miscible in water; and a water insoluble organic chemical;

wherein substantially all of the water insoluble organic chemical is provided in said disperse phase, wherein the organic solvent is present in an amount that is less than 5% by weight based on the weight of the latex polymer, and wherein the water insoluble organic chemical is at least one of a vulcanizing agent, a vulcanization accelerator, a prevulcanization inhibitor, an antireversion agent, and an antioxidant.

17. The styrene-butadiene rubber latex dispersion according to claim 16, wherein at least 90% of said water insoluble organic chemical is provided in said disperse phase.

18. The styrene-butadiene rubber latex dispersion according to claim 16, wherein a substantial portion of said organic solvent is in said disperse phase.

19. The styrene-butadiene rubber latex dispersion according to claim 18, wherein at least 50% of said organic solvent is in said disperse phase.

20. The styrene-butadiene rubber latex dispersion according to claim 16, wherein the organic solvent is selected from the group consisting of C1–C3 alcohols, acetone, dioxane, methyl ethyl ketone (MEK) and N-methyl-2-pyrrolidone (NMP).

21. The styrene-butadiene rubber latex dispersion according to claim 16, wherein the organic solvent is selected from the group consisting of acetone and N-methyl-2-pyrrolidone (NMP).

22. The styrene-butadiene rubber latex dispersion according to claim 16, wherein the styrene-butadiene rubber latex particles are derived from monomers consisting essentially of styrene, butadiene and optionally acrylonitrile.

23. The styrene-butadiene rubber latex dispersion according to claim 16, wherein the styrene-butadiene rubber latex particles are non-functionalized styrene-butadiene rubber latex particles.

24. The styrene-butadiene rubber latex dispersion according to claim 16, further comprising a natural soap.

25. The styrene-butadiene rubber latex dispersion according to claim 24, wherein the natural soap is selected from the group consisting of sodium or potassium oleate and the sodium or potassium salt of rosin acid.

26. The styrene-butadiene rubber latex dispersion according to claim 16, having a total solids content of at least 65% by weight.

27. The styrene-butadiene rubber latex dispersion according to claim 16, wherein the organic solvent has a boiling point of less than about 185° C.

28. The styrene-butadiene rubber latex dispersion according to claim 16, wherein the organic solvent has a boiling point of greater than about 180° C.

29. The styrene-butadiene rubber latex dispersion according to claim 16, including less than 2% by weight of the organic solvent based on the weight of the latex polymer.

* * * * *